United States Patent
Park et al.

(10) Patent No.: US 9,544,580 B2
(45) Date of Patent: Jan. 10, 2017

(54) IMAGE PROCESSING METHOD AND IMAGE PROCESSING APPARATUS

(71) Applicant: SAMSUNG ELECTRONICS CO., LTD., Suwon-si (KR)

(72) Inventors: Ju Yong Park, Seongnam-si (KR); Dong Kyung Nam, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 414 days.

(21) Appl. No.: 14/068,242

(22) Filed: Oct. 31, 2013

(65) Prior Publication Data

US 2014/0118512 A1    May 1, 2014

(30) Foreign Application Priority Data

Oct. 31, 2012  (KR) .................. 10-2012-0122346

(51) Int. Cl.
  *H04N 13/00* (2006.01)
  *H04N 13/04* (2006.01)

(52) U.S. Cl.
  CPC ...... *H04N 13/0447* (2013.01); *H04N 13/0014* (2013.01); *H04N 13/0404* (2013.01); *H04N 13/0409* (2013.01); *H04N 13/0468* (2013.01); *H04N 13/047* (2013.01); *H04N 13/0475* (2013.01); *H04N 13/0477* (2013.01); *H04N 2013/0463* (2013.01)

(58) Field of Classification Search
  CPC .................. H04N 13/0447; H04N 13/0014
  USPC .......................................... 348/46
  See application file for complete search history.

(56) References Cited

U.S. PATENT DOCUMENTS

| | | | |
|---|---|---|---|
| 6,831,641 B2 | 12/2004 | Matusik et al. |
| 7,792,423 B2 | 9/2010 | Raskar et al. |
| 7,903,737 B2 | 3/2011 | Martinian et al. |
| 8,044,994 B2 | 10/2011 | Vetro et al. |
| 8,189,065 B2 | 5/2012 | Georgiev et al. |
| 2008/0043096 A1 | 2/2008 | Vetro et al. |

(Continued)

FOREIGN PATENT DOCUMENTS

| | | |
|---|---|---|
| CN | 101411207 B | 7/2010 |
| CN | 102056003 A | 5/2011 |

(Continued)

OTHER PUBLICATIONS

Chinese Office Action issued by the Chinese Patent Office on Jan. 14, 2016 for the corresponding Chinese Patent Application No. 201310524977.9, 12 Pages in English, 8 pages in Chinese.

(Continued)

*Primary Examiner* — Jeffery Williams
(74) *Attorney, Agent, or Firm* — NSIP Law

(57) ABSTRACT

An image processing apparatus and method for processing an image using a multi-view image and pixel information are provided. The image processing method includes determining a view image that corresponds to a predetermined display direction of a display pixel of a display, determining at least one view image pixel corresponding to the display pixel in the determined view image based on a position of the display pixel in the display and pixel position information of the determined view image, and determining a pixel value of the display pixel based on a pixel value of the determined at least one view image pixel.

19 Claims, 12 Drawing Sheets

(56) References Cited

U.S. PATENT DOCUMENTS

| | | |
|---|---|---|
| 2008/0170293 A1 | 7/2008 | Lucente et al. |
| 2008/0239066 A1 | 10/2008 | Nayar et al. |
| 2009/0282429 A1 | 11/2009 | Olsson et al. |
| 2011/0242289 A1 | 10/2011 | Fukushima et al. |
| 2012/0113097 A1 | 5/2012 | Nam et al. |
| 2012/0169724 A1 | 7/2012 | Park et al. |
| 2013/0135311 A1* | 5/2013 | Kaneko .............. H04N 13/0066 345/427 |

FOREIGN PATENT DOCUMENTS

| | | |
|---|---|---|
| CN | 102726036 A | 10/2012 |
| KR | 10-2010-0053922 | 5/2010 |
| KR | 10-2010-0053935 | 5/2010 |
| KR | 10-2011-0124701 | 11/2011 |
| TW | 200538849 A | 12/2005 |

OTHER PUBLICATIONS

M. Levoy, et al., "Light Field Rendering," Proceedings from the ACM SIGGRAPH, Jul. 1996, pp. 1-12.

C. Buehler, et al., "Unstructured Lumigraph Rendering," Proceedings from the Annual Conference Series Computer Graphics, SIGGRAPH, Aug. 2001, pp. 425-432.

Extended European Search Report issued on Sep. 29, 2015, in counterpart European Application No. 13190799.0 (9 pages, in English).

* cited by examiner

IMAGE PROCESSING METHOD AND IMAGE PROCESSING APPARATUS

CROSS-REFERENCE TO RELATED APPLICATIONS

This application claims the priority benefit of Korean Patent Application No. 10-2012-0122346, filed on Oct. 31, 2012, in the Korean Intellectual Property Office, the disclosure of which is incorporated herein by reference.

BACKGROUND

1. Field

One or more embodiments of the following description relate to a display image processing method and apparatus for light field displaying using a multi-view image.

2. Description of the Related Art

To effectively realize a 3-dimensional (3D) image providing a 3D feel or effect, images of different views may to be presented to an observer. For example, a stereoscopic display may present respectively different images to a left eye and a right eye of a person. The stereoscopic display may depend on a filtering process, where filtering glasses are worn, so one image is filtered to a left eye and another image is filtered to the right eye. To realize the 3D image without using such a filter process, the 3D feel or effect may be achieved by presenting different spatially divided views of a scene to the observer, as an example of an autostereoscopic display. Such an autostereoscopic display may use an optical unit to realize an image by spatially dividing the image. Representatively, a lenticular lens or a parallax barrier may be used as the optical unit. The lenticular lens expresses each pixel image only in a particular direction whereas the parallax barrier shows only particular pixels from a particular direction through a slit.

The autostereoscopic display may be considered a light field display when using a principle of a light field. The light field refers to a field indicating intensities of light at all points on a 3D space in all directions. Therefore, the light field is appropriate for expressing an actual object in a space. The light field display may realize a 3D image similar to an actual object by realizing a light field in an actual space.

Such light field display methods also include an integral imaging method that realizes a general light field. According to the integral imaging method, from spots present in a predetermined space, light emitted in plural directions may be realized, using a principle that an actual object generates or reflects light in plural directions from one spot.

When the light field is used, light emitted from a plurality of spots in a plurality of directions may be expressed. However, when a multi-view image is input, display pixels and view image pixels may not usually correspond one to one because positions of pixels for realizing an image of a particular view and directions of light emitted from the pixels are not specifically defined.

SUMMARY

In one or more embodiments, to realize a 3D image with a multi-view image input in a display using the light field principle, respective view image pixel information from one or more view images of the multi-view image may be correlated or interpolated to be realized by the light field display for respective display pixels.

One or more embodiment provide a image processing method including determining a view image that corresponds to a predetermined display direction of a display pixel of a display, determining at least one view image pixel corresponding to the display pixel in the determined view image based on a position of the display pixel in the display and pixel position information of the determined view image, and determining a pixel value of the display pixel based on a pixel value of the determined at least one view image pixel.

One or more embodiments provide a image processing apparatus including a view image determination unit to determine a view image that corresponds to a predetermined display direction of a display pixel of a display, a view image pixel determination unit to determine at least one view image pixel corresponding to the display pixel in the determined view image based on a position of the display pixel in the display and pixel position information of the determined view image, and a pixel value determination unit to determine a pixel value of the display pixel based on a pixel value of the determined at least one view image pixel.

The image processing apparatus may further include the display, as a light field display. The light field display may be an integral image light field display. The light field display may include one of a lenticular lens or a parallax barrier. The light field display may be a projection system and further include a plurality of projectors.

The image processing apparatus may further include a display pixel recognition unit to recognize which display pixels of the display to which a pixel value is to be determined by the pixel value determination unit based on determined positions of user eyes indicating which of the display pixels the user would observe.

The view image determination unit may include a view image interpolation unit to interpolate at least two of the plural different-view images having viewing directions close to the predetermined display direction of the display pixel.

The pixel value determination unit may include a pixel value interpolation unit to interpolate pixel values of determined close view image pixels.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
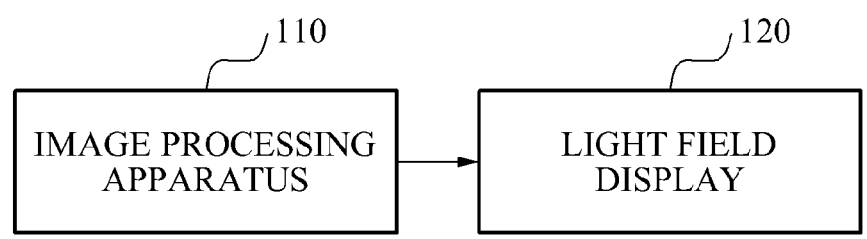
FIG. 1 illustrates an image processing apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an image processing apparatus, according to one or more embodiments.

Referring to FIG. 1, a light field display system may include an image processing apparatus 110 and a light field display 120, for example.

The light field display 120 refers to a display that displays an object using a light field principle. The light field display 120 may be used to express an intensity and a direction of light generated or reflected by an object in a 3-dimensional (3D) space as represented by intensities and directions of light provided by respective view images of a multi-view image. For example, the light field display 120 may use a group of pixels outputting rays of light in a particular direction or use a plurality of projectors and a screen. In addition, the light field display 120 may employ an optical unit such as a lenticular lens or a parallax barrier. The light field display 120 may include a multi-view 3D display or a display applying an integral imaging method.

The image processing apparatus 110 may correlate pixel information from a multi-view image, e.g., different view images, using pixel information of the light field display 120 so that the multi-view image suits a realization method of the light field display 120. The pixel information of the light field display may include information on positions of display pixels included in the light field display 120 and directions of rays emitted/emanating from the display pixels.

In one or more embodiments, the multi-view image refers to plural images taken of a scene, e.g., an object, at the same time from different views. For example, the multi-view image may be taken by a camera array including a plurality of arranged cameras. According to positions of the respective cameras in the camera array, view images of respectively different views may be obtained. Different configurations of the camera array are available, such as real or virtual cameras arranged to surround whole or portions of a real or virtual object either with equal or differing distances from the object.

The image processing apparatus 110 may derive photographing information from or for each view image, such as the photographing location and/or relative position with each other or the object or scene, so a view direction may be determined for each view image. Such photographing information may include such a photographing location (3D position), a photographing direction (3D direction), field of view, etc., for each view image. Depending on embodiment, the photographing location and photographing direction may be derived from provided fixed coordinate information of the camera array, for example. Such photographing information regarding the view images may be received in the form of metadata, and the like, such that information for calculating the pixel values of the display pixels according to differing embodiments can be made in a form of one or more look-up table (LUT), e.g., stored in a memory of the display included with or in the image processing apparatus and light field display 120, that may be based on the known display directions of the display pixels of the light field display 120 and one or more expected photographing information for discerning corresponding view image directions. Here, depending on the received photographing information metadata the appropriate LUT may be used to calculate the display pixel values. Such LUTs may be defined during manufacture and/or created or updated subsequently.

Though embodiments are not limited thereto, in one or more embodiments, the number of received view images may be the same as the number of available viewing directions of the light field display 120. In addition, depending on embodiments, the provided view images may be provided uncompressed each frame or in a compressed form, such as through spatial or temporal prediction. As another example, for each view image, each new received frame may only need to represent a difference between the present frame and a previous frame. The aspect ratio, resolution, and photographing conditions of the respective view images may be the same or different.

Accordingly, when the multi-view image is input, the image processing apparatus 110 may determine the appropriate view image corresponding to respective individual display pixels of the light field display 120. The image processing apparatus 110 may determine the view image based on the pixel information of the individual display pixels, among a plurality of the view images. Alternatively, the image processing apparatus 110 may generate a view image of a new view by interpolating the plurality of view images, and determine the generated view image as the view image corresponding to the display pixel.

When the appropriate view image corresponding to the individual display pixel is determined, the image processing apparatus 110 may determine a pixel value of the display pixel based on a pixel value of a corresponding pixel of the appropriate view image. Alternatively, the image processing apparatus 110 may determine the pixel value of the display pixel by interpolating pixel values of a plurality of view image pixels of the same or different view images. Accordingly, even when the number of available viewing directions is the same as the number or received view images, the viewing directions may not be completely in accord with the photographing position of the view images. In such a situation, depending on embodiment, the image processing apparatus may determine a pixel value to be expressed by selecting a view image/pixel closest to the desired position, or by selecting a plurality of view images (n) close to the desired position, and a plurality of pixels (m) close to the position of the pixel to be expressed for each view image, and then perform the interpolation process using n*m pixels, for example. Through the foregoing process, the image processing apparatus 110 may correlate the differing view images of the multi-view image into a displayed image appropriate for the light field display 120.

Additionally, the image processing apparatus 110 may provide a user with a realistic feel of a 3D object, by providing a light field similar to an actual light field generated in the 3D object. Also, the image processing apparatus 110 may provide the realistic feel as if the 3D object in the light field display 120 were fixed even when the user moves.

Figure 2:
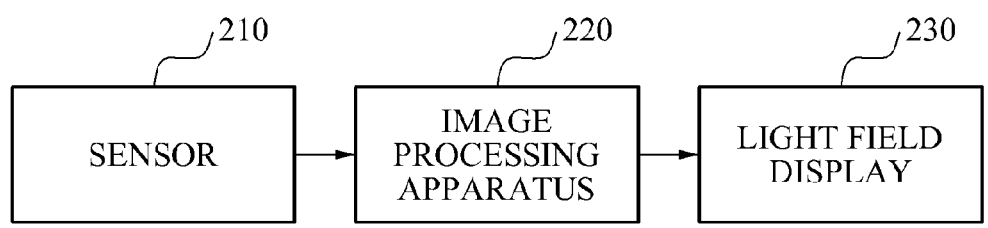
FIG. 2 illustrates an image processing apparatus which processes an image in association with a sensor, according to one or more embodiments.

FIG. 2 illustrates an image processing apparatus which processes an image in association with a sensor, according to one or more embodiments.

According to FIG. 2, a light field display system includes a sensor 210, an image processing apparatus 220, and a light field display 230, for example. In one or more embodiments, as only an example, the image processing apparatus 220 and the light field display 230 may operate the same as the image processing apparatus 110 and light field display 120.

The sensor 210 may detect positions of one or more observers, or one or more observer's eyes, in front of the light field display 230. In an embodiment, the sensor 210 may be a camera that photographs the user eyes and thereby generates a 3D spatial coordinate for the user or user's eyes. Here, the camera may be embedded in the light field display 230, or mounted externally and connected with the light field display 230. As only examples, the camera may include at least one selected from at least one visible band camera, at least one infrared (IR) camera, and at least one depth camera.

In the one or more embodiments, the image processing apparatus 220 may calculate the positions of the user eyes, using a 2D image taken by a camera and a depth image including depth information. The image processing apparatus 220 may obtain position information about two axes of the 3D spatial coordinate, based on a position and direction of the camera in the 2D image, and obtain position information about a remaining one axis from the depth image. The image processing apparatus 220 may calculate the positions of the user eyes by combining the obtained position information.

Thus, in one or more embodiments, in addition to the above discussion regarding the image processing apparatus 110, the image processing apparatus 220 may recognize display pixels for image processing, based on the positions of the user eyes. In detail, the image processing apparatus 220 may recognize the display pixels present within a predetermined distance, based on a distance between rays emanating from the display pixels and the positions of the user eyes. In one or more embodiments, the image processing apparatus 220 may reduce an amount of calculation by selectively performing such image processing with respect to the display pixels included in the light field display 230. For example, as a result of eye tracking, when a difference between a direction from a display pixel to the eyes and an intended direction of expression for the display pixel is greater than a threshold value, the image processing apparatus may not process the foregoing pixel as it may not have been viewable. Rather, in the event that such a pixel contributes to an output of the information to the eyes, a view image closest to the intended direction of expression for the pixel may be the view image close to the position of the user eyes.

That is, in one or more embodiments, the image processing apparatus 220 may determine a view image only with respect to a recognized display pixel corresponding to the view image, and determine a pixel value of the corresponding display pixel. As noted, in one or more embodiments, reference to the above discussion regarding the image processing apparatus 110 of FIG. 1 can be made for similar operations of determining the view image and determining the pixel value of the display pixel by the image processing apparatus 220.

The image processing apparatus 220 may provide different contents according to the positions of the user eyes, using the positions of the user eyes. Also, the image processing apparatus 220 may provide different contents to different users at the same time, based on the determined respective positions of the user eyes.

Figure 3:
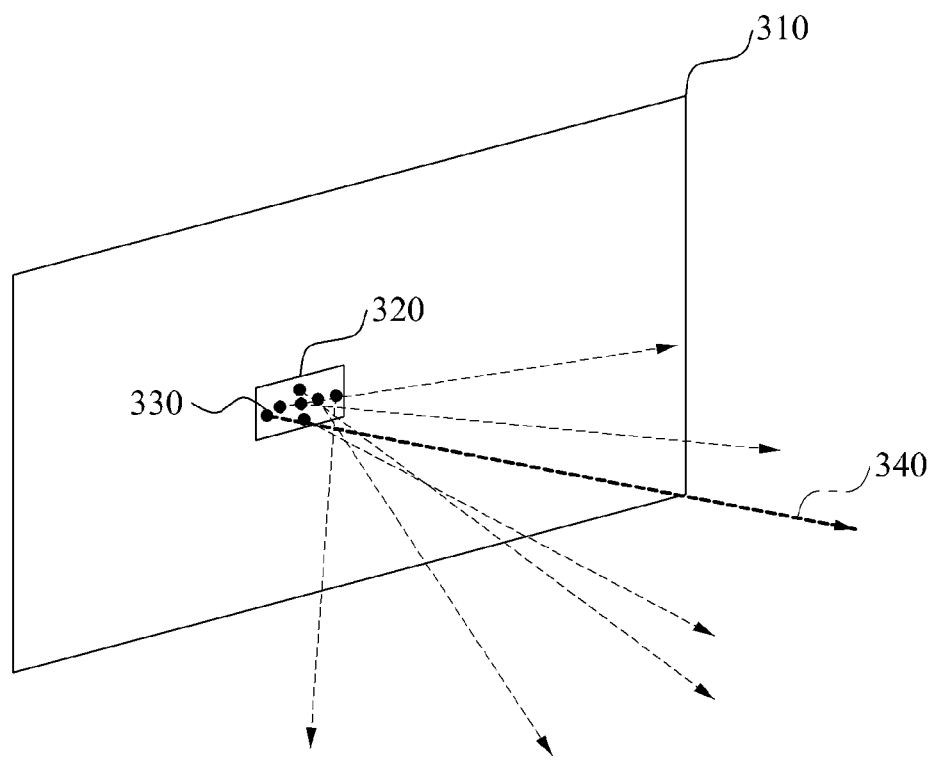
FIG. 3 illustrates a light field display including 3-dimensional (3D) pixels, according to one or more embodiments.

FIG. 3 illustrates a light field display 310 including a plurality of 3D pixels 320, according to one or more embodiments.

According to FIG. 3, the light field display 310 may include the plurality of 3D pixels 320. In one or more embodiments, each 3D pixel 320 may include plural display pixels 330 to output rays 340 in respective predetermined directions. Alternatively, the 3D pixel 320 may emit or project the rays 340 in various directions using an additional optical filter such as a lenticular lens, a parallax barrier, or a microlens array, as only an example. Accordingly, the display pixels 330 are gathered as a 3D pixel and therefore spots on a 3D space may be displayed through the light field display 310 for the 3D effect.

Regarding the 3D pixels 320, positions of the display pixels 330 and information on the directions of rays 340 emanating from the display pixels 330 may be stored in advance in the light field display 310 or an image processing apparatus, such as in the aforementioned LUT(s). Here, the light field display 310 and corresponding image processing apparatus may be included in a single enclosure, such as a television or display device, or embodied as separately enclosed elements. The positions of the display pixels 330 and the information on the rays 340 emanating from the display pixels 330 may be varied according to design conditions of the light field display 310 and a optical filter being used, depending on embodiment.

Directions of the rays 340 emanating from the display pixels 330 may include either or both of a horizontal direction and a vertical direction. For example, when the rays 340 emanating from the display pixels 330 have a particular direction in the horizontal direction but advance in all directions in the vertical direction, the light field display 310 may form a horizontal light field. Conversely, when the rays 340 emanating from the display pixels 330 have a particular direction in the vertical direction but advance in all directions in the horizontal direction, the light field display 310 may form a vertical light field. In addition, when the rays 340 advance in a particular direction in both the horizontal direction and the vertical direction, the light field display 310 may form a light field with respect to all directions.

As only an example, when the light field display is a multi-view display, the horizontal direction of the projection may be fixed in the light field display using a parallax barrier or lenticular lens. When the light field display is an integral imaging display, the vertical direction of the projection as well as the horizontal direction may be fixed. Here, one or more embodiments herein would be applicable to both displays. In one or more embodiments, in the case of the integral imaging display, only the vertical direction may be considered when determining the position of the pixel in the view images.

In the case of the display using a multi projector, the direction of the projection may be fixed based on the central position of the projector positioned at the rear surface of the screen. One or more embodiments herein may include displaying the multi-view image in the display using the multi projector. Depending on embodiment, in a case of the display in which the direction of the projection is not fixed, a structure varying the parallax barrier or the lenticular lens may be provided. In this case, the direction of the projection according to one or more embodiments may be determined according to the varied structure. Therefore, when the direction of the projection can be determined according to varied situations, one or more embodiments herein can be also applied to a light field display in which the direction of the projection is not fixed.

Figure 4:
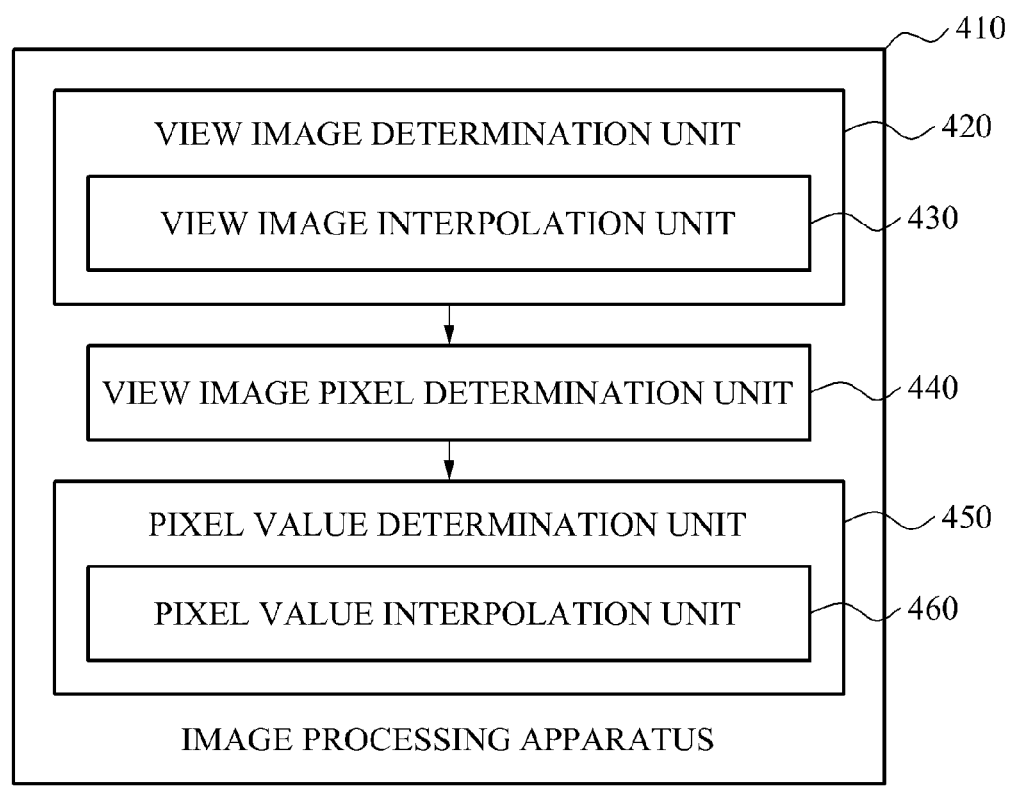
FIG. 4 illustrates a detailed structure of an image processing apparatus, according to one or more embodiments.

FIG. 4 illustrates an image processing apparatus 410, according to one or more embodiments.

According to FIG. 4, the image processing apparatus 410 may include a view image determination unit 420, a view image pixel determination unit 440 and a pixel value determination unit 450, for example. As further examples, the view image determination unit 420 may include a view image interpolation unit 430 and/or the pixel value determination unit 450 may include a pixel value interpolation unit 460, noting that alternative embodiments are also available. The image processing apparatus 410 may represent a collection of a corresponding image processing apparatus, such as in FIGS. 1 and 2, and a light field display.

The view image determination unit 420 may determine the appropriate view image(s) corresponding to rays respectively emanating from different display pixels, e.g., in different directions for a same 3D pixel, using the emanating rays and different views of the view images making up a multi-view image. Herein, as only an example for simplification of explanation, the consideration of the emanating ray may include a projection of the emanating ray onto a plane representing the placement or view directions of plural view images, such that projection of the emanating ray may provide for a comparison between the display direction of the corresponding display pixel and the one or more view images whose viewing direction may be determined to most closely aligned with the display direction of the corresponding display pixel.

Each of the display pixels may output light that can be represented as emanating rays each having a predetermined advancing direction. Information on the direction of the emanating rays may be stored in advance in a light field display or the image processing apparatus 410, or a combination of the same, such as in one or more of the aforementioned LUTs. The respective views of the view images can refer to positions at which the respective view images are taken. For example, the respective views may indicate positions at which a real and/or virtual camera photographs a real or virtual object or scene. As noted above, depending on embodiment, the respective views of the view images may be obtained from information such as a distance between an object or spot in 3D space and the camera, a photographing angle, and the like.

The view image determination unit 420 may determine the respective view images corresponding to the differing rays emanating from display pixels, using the respective emanating rays and positions of the respective views of the view images. In detail, the view image determination unit 420 may select one or more view images that has a closest view as the particular emanating ray from a particular display pixel, from among the plurality of view images.

According to one or more embodiments, the view image determination unit 420 may calculate distances between the received view images making up the multi-view image and a projection of particular rays emanating from one or more particular display pixels. The view image determination unit 420 may then select one or more view images that has a view of a shortest distance, e.g., within a shortest threshold, among the calculated distances as the view images corresponding to the particular rays from the one or more particular display pixels. Here, in an embodiment, a single view image may be selected for a particular display pixel. Still further, such calculations of the distances may be performed prior to receipt of the multi-view image if photographing properties/information of the expected multi-view image is known. Examples of such photographing properties/information of multi-view image is discussed above. The results of such distance calculations may be stored in a LUT, e.g., before receipt of the multi-view image, or after receipt of a multi-view image for use in receipt of a next multi-view image having similar or same photographing properties/information. In one or more embodiments, when multi-view images with different photographing properties/information are expected or enabled for display by the image processing apparatus and light field display combination, for example, there may be multiple such LUTs with calculated distance results or view image/view image pixel determination results, e.g., such representing a predetermined mapping of particular display pixels to particular view images or view image pixels.

In one or more embodiments, the view image determination unit 420 may include the view image interpolation unit 430 that may be used to selectively, for example, interpolate a plurality of selected view images having views close to an emanating ray of one or more particular display pixels, e.g., based on the above discussed distance calculations. Here, the view image interpolation unit 430 may generate a new view image having a new view by interpolating the plurality of selected view images. Through the foregoing process, the view image interpolation unit 430 may generate a new view image having a view located in a direction of the emanating rays. In one or more embodiments, one or more new view images may be interpolated between existing view images of a received multi-view image before a particular emanating ray of a particular display pixel is considered, e.g., independent of calculated distances between emanating rays and view images. Alternatively, such an independent interpolation operation may be performed at the same time as when a color value for a particular display pixel is being calculated, e.g., by the view image determination unit 410.

According to one or more embodiments, when the calculated distances between the projection of the rays emanating from a particular display pixel and particular views of the view images are within a predetermined threshold range, the view image interpolation unit 430 may select the corresponding particular view images and perform interpolation between the particular view images. As only an example, the view image interpolation unit 430 may interpolate between the selected view images, by averaging pixel values at respective positions corresponding to the selected view images to be interpolated or by using various predetermined interpolation formulas. The view image determination unit 420 may determine that the interpolated view image corresponds to the particular display pixel or the corresponding emanating ray.

Accordingly, the view image pixel determination unit 440 may determine at least one view image pixel corresponding to the respective display pixels in the determined view image, determined by the view image determination unit 420, based on known positions of the display pixels.

The view image pixel determination unit 440 may recognize a display region in which the determined view image, or each of the determined view images, is to be displayed in the light field display. Next, the view image pixel determination unit 440 may recognize a coordinate corresponding to the positions of the respective display pixels in the display region. The view image pixel determination unit 440 may determine the corresponding view image pixel using the coordinate corresponding to the positions of the respective display pixels in the display region of the corresponding determined view images.

In detail, the view image pixel determination unit 440 may recognize one or more pixels corresponding to the coordinate, among view image pixels of a determined view image. According to one or more embodiments, the view image pixel determination unit 440 may determine a view image pixel closest to a position in the determined view image corresponding to the coordinate, as the view image pixel corresponding to a display pixel.

Alternatively, the view image pixel determination unit 440 may determine view image pixels close to the position of the determined view image corresponding to the coordinate, as the view image pixel corresponding to the display pixel. The view image pixel determination unit 440 may determine a plurality of view image pixels as the view image pixel corresponding to the display pixel. For example, the view image pixel determination unit 440 may determine the view image pixels included in the predetermined threshold range, based on the position of the determined view image corresponding to the coordinate and distances between the view image pixels. As noted above, operations of the view image determination unit 420 and view image pixel determination unit 440 may be performed prior to receipt of the multi-view image, e.g., if photographing properties/information of the multi-view image are known.

The pixel value determination unit 450 may determine pixel values of the display pixels based on pixel values of the view image pixels determined by the view image pixel determination unit 440. The pixel value determination unit 450 may determine the pixel values of the view image pixels to be the pixel values of the corresponding display pixels. That is, the pixel value determination unit 450 may apply the pixel values of the respective view image pixels corresponding to the display pixels to the corresponding display pixels.

When the view image pixel determination unit 440 determines a plurality of view images close to the coordinate corresponding to the display pixel, the pixel value interpolation unit 460 may interpolate the pixel values of the determined view image pixels. The pixel value interpolation unit 460 may interpolate the pixel values by averaging the pixel values of the respective view image pixels or by applying a predetermined interpolation formula. The pixel value determination unit 450 may determine the interpolated pixel values to be the pixel values of the display pixels.

Through the foregoing process, the appropriate view image is determined with respect to each display pixel of the light field display, and most proper pixel values are applied to the respective display pixels based on the pixel values of the corresponding view images. The image processing apparatus 410 may perform image correlation based on a multi-view image, so that the different view images of the multi-view image are appropriate for a realization method of the light field display.

Although a number of the views of the view images included in the multi-view image may not correspond to a number of directions of emanating rays expressed by the display pixels of the light field display, the image processing apparatus 410 may convert the received multi-view image into a multi-view image appropriate to be realized by the light field display. For example, new view images may be interpolated and/or view images may be redacted from the received multi-view image. In addition, irrespective of types of the optical filter included in the light field display, the image processing apparatus 410 may perform image processing using information on the rays emanating from the display pixels. The image processing apparatus 410 may apply the foregoing image processing process with respect to a light field display of which a method for realizing the rays is determined, e.g., for a light field display that is a multi-view light field display, an integral light field display, or a multi-view projector system.

Figure 5:
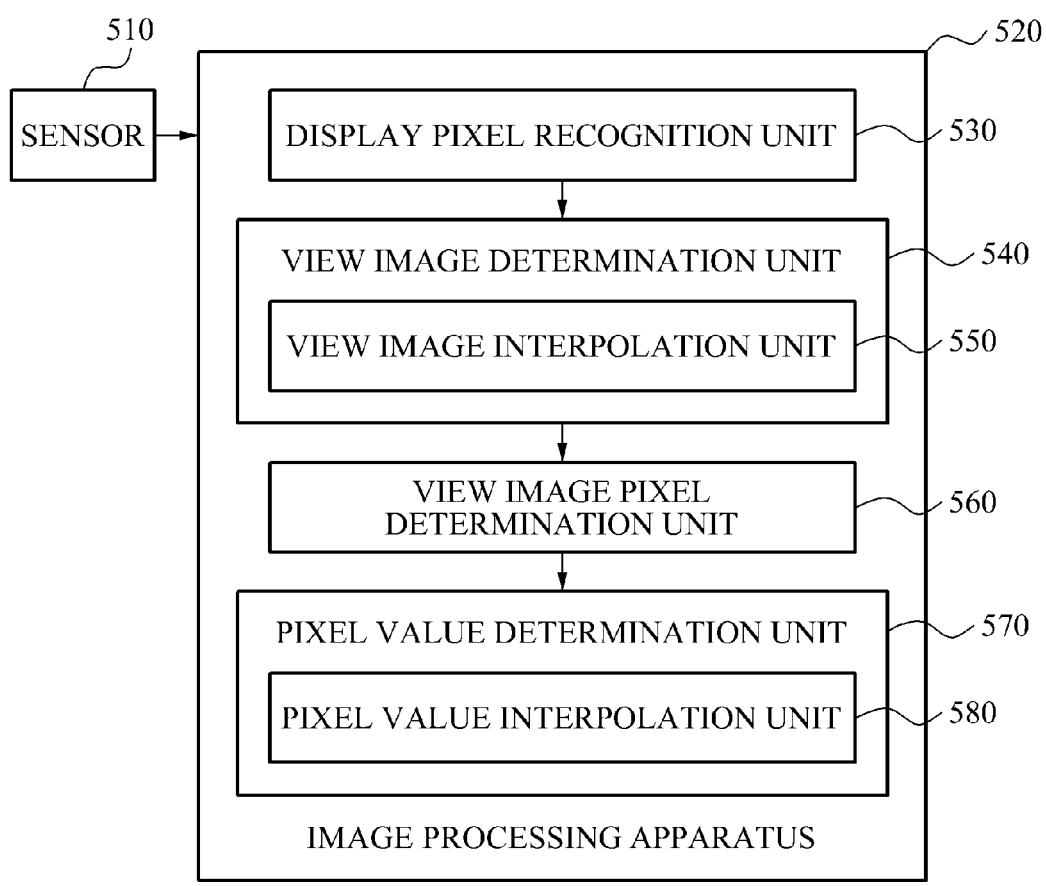
FIG. 5 illustrates a detailed structure of an image processing apparatus, according to one or more embodiments.

FIG. 5 illustrates an image processing apparatus 520, according to one or more embodiments.

According to FIG. 5, the image processing apparatus 520 may include a display pixel recognition unit 530, a view image determination unit 540, a view image pixel determination unit 560, and a pixel value determination unit 570, for example. As a further example, the view image determination unit 540 may include a view image interpolation unit 550 and/or the pixel value determination unit 570 may include a pixel value interpolation unit 580, noting that alternative embodiments are also available. Depending on embodiment, any of the features discussed above regarding the view image determination unit 420, view image interpolation unit 430, view image pixel determination unit 440, pixel value determination unit 450, and pixel value interpolation unit 460 of FIG. 4 may be equally included or implemented by the respective view image determination unit 540, view image interpolation unit 550, view image pixel determination unit 560, pixel value determination unit 570, and pixel value interpolation unit 580. In addition, depending on embodiment, any of the features of the sensor 210, image processing apparatus 220, and light field display 230 of FIG. 2 may be included or implemented by the image processing 520.

With regard to FIG. 5, the display pixel recognition unit 530 may recognize particular display pixels to which pixel values are to be applied, based on positions of user eyes. The positions of the user eyes may be obtained using a sensor 510. For example, the sensor 510 may be a camera that photographs the user eyes and thereby generates a 3D spatial coordinate. Here, the camera may be embedded in a light field display, or mounted externally and connected with the light field display, and the image processing apparatus 520 may represent a collection of a corresponding image processing apparatus, such as in FIG. 2, and the light field display. The display pixel recognition unit 530 may obtain the positions of the user eyes using a 2D image of the user eyes or a depth image of the user eyes, as only examples.

In detail, the display pixel recognition unit 530 may recognize at least one display pixel satisfying that respective distances between rays emanating from the display pixels and the user eyes are not more than a predetermined threshold, for example. In one or more embodiments, the predetermined threshold may be set depending on whether the rays emanating from the display pixels are included in a visible region, i.e., viewable by the user. Here, the visible region may be predetermined as a region in which the rays emanate from the display pixels and are seen to the user eyes. That is, in an embodiment, the predetermined threshold may take into consideration that although rays emanating from the display pixels may not directly reach the pupils of the user eyes, a predetermined amount of light of represented by the emanating rays may reach and be visible to the user eyes.

Through the foregoing process, the display pixel recognition unit 530 may recognize the particular display pixels which are objects of image processing. Therefore, the image processing apparatus 520 may reduce an amount of calculation required for the image processing and rapidly perform image conversion, e.g., by not having to determine the appropriate view image, determine the corresponding image pixel, and/or determine the pixel value for display pixels that are recognized as not being display pixels for which image processing is performed.

The view image determination unit 540 may determine the appropriate view image(s) corresponding to the rays respectively emanating from different display pixels, e.g., in different directions for a same 3D pixel, recognized by the display pixel recognition unit 530, using the emanating rays and different views of the view images. In detail, the view image determination unit 540 may determine view images having a closest view to the emanating rays, among the plurality of view images, as the view images corresponding to the rays. Here, in one or more embodiments, the consideration of only the different display pixels recognized by the display pixel recognition unit 530 for further processing by the view image determination unit 540, view image interpolation unit 550, view image pixel determination unit 560, pixel value determination unit 570, and pixel value interpolation unit 580 may be selectively performed when information from sensor 510 is available or such selective display pixel recognition by the display pixel recognition unit 530 is enabled, e.g., by a user selection of available features for the image processing apparatus 520.

Accordingly, depending on embodiment, either for all display pixels or for less than all display pixels, the view image determination unit 540, view image interpolation unit 550, view image pixel determination unit 560, pixel value determination unit 570, and pixel value interpolation unit 580 may then perform similarly as discussed above with respectively regard to view image determination unit 420, view image interpolation unit 430, view image pixel determination unit 440, pixel value determination unit 450, and pixel value interpolation unit 460 of FIG. 4.

Figure 6:
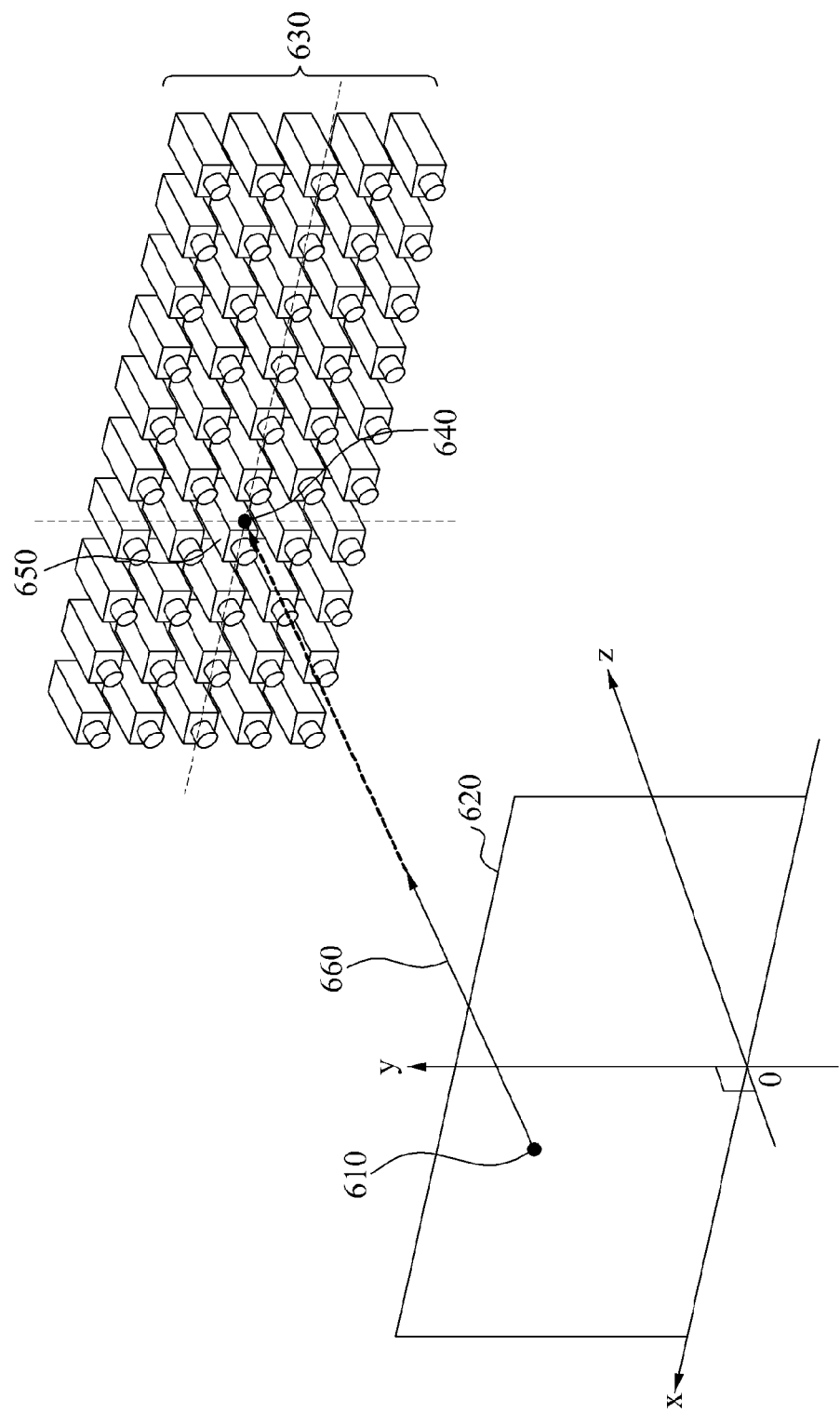
FIG. 6 illustrates an operation of determining a view image, according to one or more embodiments.

FIG. 6 illustrates an operation of determining a view image, according to one or more embodiments.

According to FIG. 6, a ray 660 emanates from one display pixel 610 of a light field display 620. Additionally, a plurality of view images 630 are shown with respect to a position of the light field display 620. The view images 630 may each represent different views. As only an example, the views of the view images 630 may correspond to positions of a real or virtual camera photographing a real or virtual object or scene.

In FIG. 6, the view images 630 taken by a camera array having a plane structure are shown, as only an example, noting that alternative configurations for such a camera array are equally available. In one or more embodiments, an image processing apparatus may calculate distances between a projection of the ray 660 and the respective views of the view images with reference to a spot 640 at which the projection of the ray 660 meets a plane of the camera array. The image processing apparatus may determine a view image 650 based on the view image 650 having a smallest value among the distances between the projection of ray 660 and the views of the view images.

Alternatively, the image processing apparatus may generate a new view image having a new view, using a plurality of view images close to the spot 640 based on the ray 660. In detail, the image processing apparatus may generate a new view image by interpolating the plurality of view images close to the spot 640 based on the ray 660, and determine the generated view image as the view image corresponding to the ray 660 of the display pixel 610.

Through the foregoing process, the image processing apparatus may generate a view image having a view located in a direction on the ray 660. In an embodiment, this may be repeated for each display pixel, and potentially processed in parallel. In an embodiment, this may be repeated for each sub-pixel of each 3D pixel, with potentially many 3D pixels being processed in parallel.

In this case, the image processing apparatus may recognize view images of which a distance between the ray 660 and the view of the view image is within a predetermined threshold range, from the view images 630. Also, the image processing apparatus may generate the view image having the new view by interpolating the recognized view images.

When the image processing apparatus generates the new view image by interpolating the plurality of close view images, the interpolation may be performed by setting a weight based on the distance between the projection of ray 660 and the corresponding view image. In one or more embodiments, the image processing apparatus may increase the set weight as the distance between the projection of the ray 660 and the corresponding view image lessens. As the weight is larger, a larger weight may be allocated to a pixel value of the corresponding view image during the interpolation, as a smaller weight may be allocated to a pixel value of another corresponding view image during the interpolation. Herein, the distance may alternatively be a measure of difference between direction of the ray 660 and the respective view images.

Figure 7:
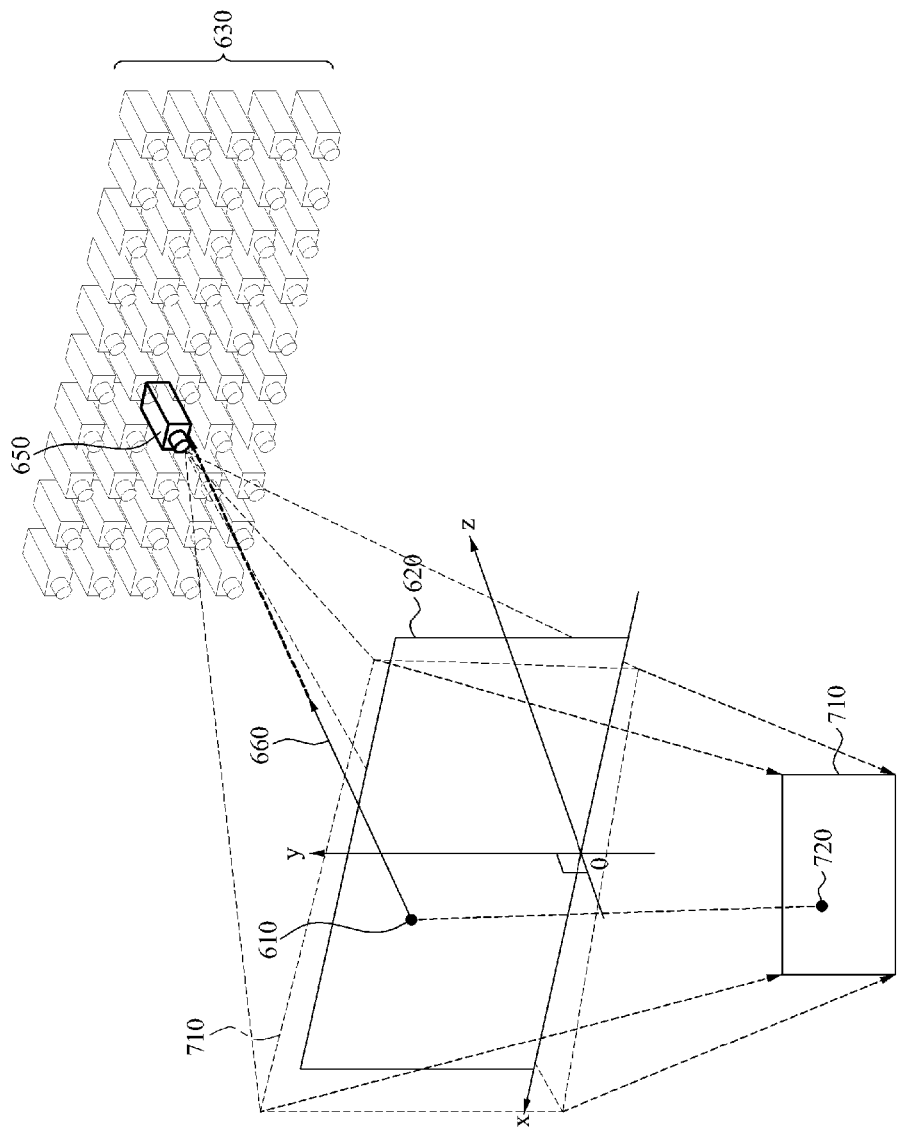
FIG. 7 illustrates an operation of determining a pixel value of a display pixel, according to one or more embodiments.

FIG. 7 illustrates an operation of determining a pixel value of a display pixel, such as the display pixel 610 of FIG. 6, according to one or more embodiments.

According to FIG. 7, when the display pixel 610 or the view image 650 corresponding to the ray 660 emanating from the display pixel 610 is determined, the image processing apparatus may determine at least one view image pixel corresponding to the ray 660 emanating from the display pixel 610 from the view image 650.

The image processing apparatus may recognize a display region 710 of the view image 650 on the light field display 620. The display region 710 may refer to a region displaying contents of the view image 650 when the view image 650 is displayed.

The image processing apparatus may recognize a coordinate 720 corresponding to the position of the display pixel 610 from the display region 710. The image processing apparatus may determine a view image pixel corresponding to the display pixel 610 in the view image 650, using the coordinate 720 in the display region 710. In this case, the image processing apparatus may determine a view image pixel closest to the coordinate 720 corresponding to the position of the display pixel 610 and apply a pixel value of the view image pixel to the display pixel 610.

Alternatively, the image processing apparatus may determine view images close to the coordinate 720 corresponding to the position of the display pixel 610. The image processing apparatus may interpolate pixel values of the view images close to the coordinate 730, thereby determining a pixel value of a corresponding display pixel 610. In this case, in one or more embodiments, the image processing apparatus may set a weight to the pixel value of the view image pixel based on a distance between the coordinate 720 and each of the view image pixels, and perform interpolation based on the weight.

Figure 8:
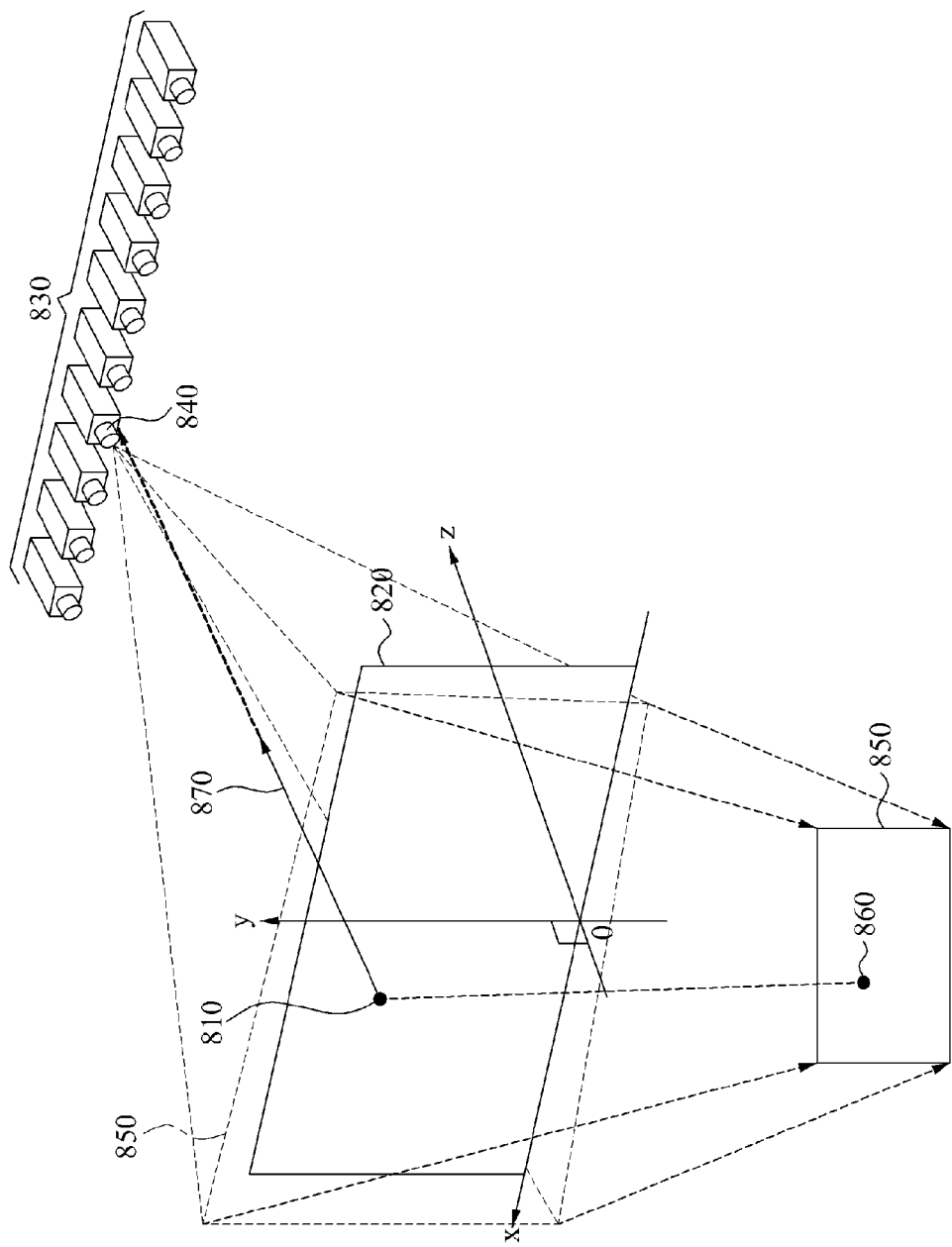
FIG. 8 illustrates an operation of determining a pixel value of a display pixel in a light field display including an optical unit, according to one or more embodiments.

FIG. 8 illustrates an operation of determining a pixel value of a display pixel in a light field display 820 including an optical unit, according to one or more embodiments.

According to FIG. 8, the light field display 820 may use an optical filter such as a lenticular lens or a parallax barrier. As only example, in one or more of the embodiments of FIG. 8, a ray 870 emanating from a display pixel 810 has a particular fixed or controlled direction in a horizontal direction due to the optical filter, while advancing in all directions in a vertical direction. In this case, a parallax may occur only in the horizontal direction and the image processing apparatus may use only horizontal components of the ray 870 emanating from the display pixel 810.

The image processing apparatus may determine a view image 840 corresponding to the display pixel 810 or the ray 870 based on distances between a projection of the ray 870 emanating from the display pixel 810 and views of view images 830. The image processing apparatus may determine a view image having a closest view to the projection of the ray 870 as the view image 840 corresponding to the display pixel 810 or the ray 870. Alternatively, the image processing apparatus may generate a view image having a view located in an advancing direction of the ray 870, by interpolating a plurality of view images close to the projection of the ray 870.

When the view image 840 is determined, the image processing apparatus may determine a pixel value of the display pixel 810 based on a coordinate 860 corresponding to a position of the display pixel 810 in a display region 850 of the view image 840. In detail, the image processing apparatus may determine a pixel value of a view image pixel closest to the position corresponding to the coordinate 860 in the display region 850, as the pixel value of the display pixel 810.

Alternatively, the image processing apparatus may interpolate pixel values of the view images close to the position corresponding to the coordinate 860 in the display region 850, thereby determining a pixel value of the corresponding display pixel 810.

Figure 9:
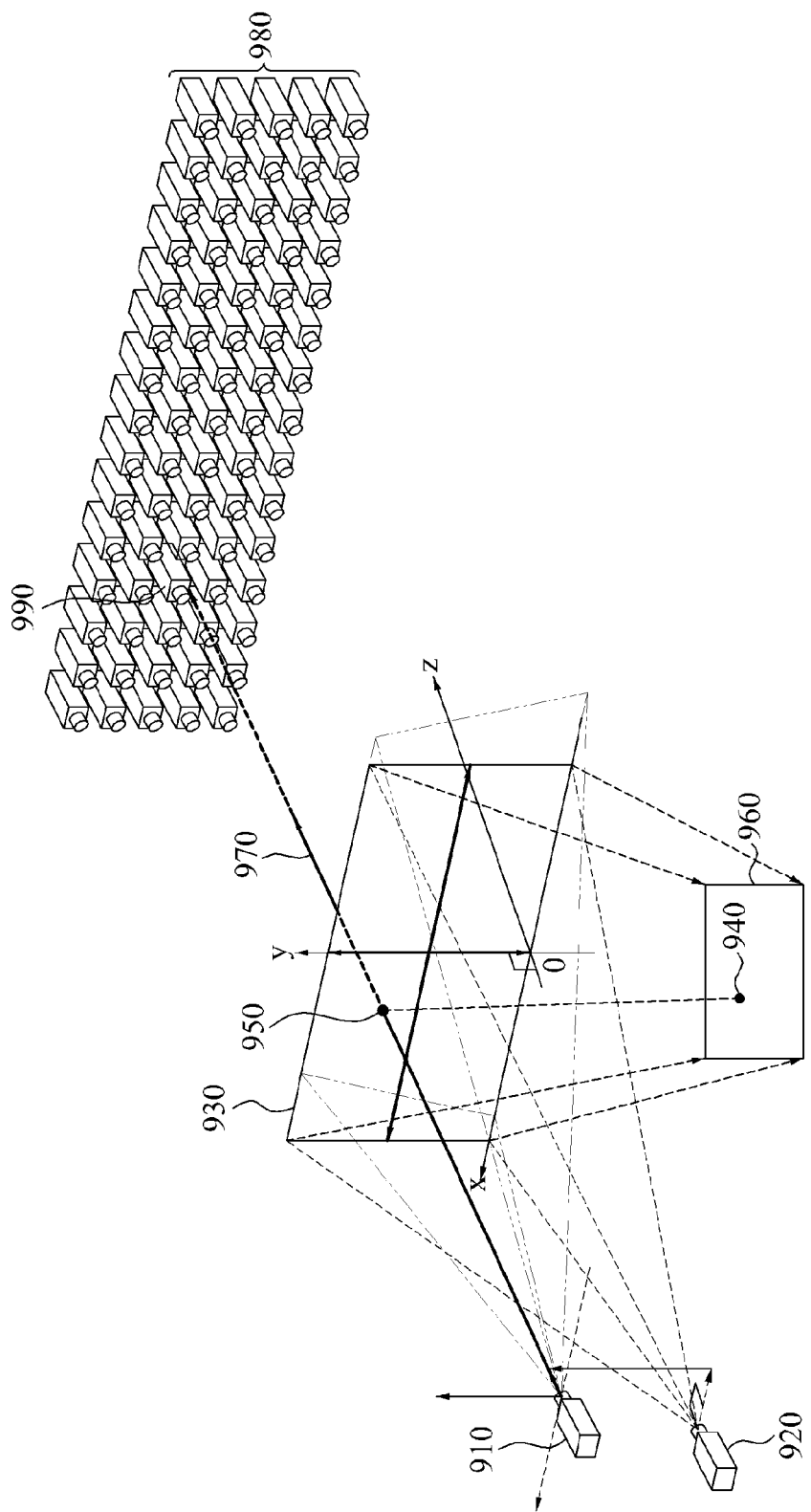
FIG. 9 illustrates an image processing operation using a plurality of projectors, according to one or more embodiments.

FIG. 9 illustrates an image processing operation using a plurality of projectors, according to one or more embodiments.

According to FIG. 9, the light field display may include a plurality of projectors 910 and 920, and a screen 930. Here, for only simplification of explanation, it is presumed that all of view images 980 input to an image processing apparatus are images of a region corresponding to the screen 930. That is, a display region of the view images 980 may be identical to a region of the screen 930.

A first projector 910 will be described, as only an example. A ray 970 emanating from one display pixel of the first projector 910 reaches a position 950 on the screen 930. The image processing apparatus may determine a view image corresponding to the display pixel, using the rays 970 and views of the view images 980.

In or more embodiments of FIG. 9, as only an example, it may be presumed that a view image 990 having a closest view to the ray 970 is determined to be the view image corresponding to the display pixel. In another manner, the image processing apparatus may generate a new view image having a view located on a projection of the ray 970 by interpolating a plurality of view images, and determine the new view image as the view image corresponding to the display pixel.

When the view image 990 is determined, the image processing apparatus, such as discussed above with regard to FIGS. 1-2 and 3-4, may determine a pixel value of a display pixel related to the ray 970, based on a coordinate 940 corresponding to a position 950 on the screen 930 in a display region 960. In detail, the image processing apparatus may determine a pixel value of a view image pixel closest to a position corresponding to the coordinate 940 in the display region 960, as the pixel value of the display pixel.

Alternatively, the image processing apparatus may interpolate pixel values of view image pixels close to the position corresponding to the coordinate 940 in the display region 960, thereby determining the pixel value of the display pixel.

The image processing apparatus may perform the foregoing process with respect to all display pixels of the first projector 910 and a second projector 920. Accordingly, the image processing apparatus may correlate the different view images of a multi-view image into an image naturally displayed on the light field display. Although the first projector 910 and the second projector 920 are illustrated in the embodiments of FIG. 9, the number of projectors constituting the light field display is not limited.

Figure 10:
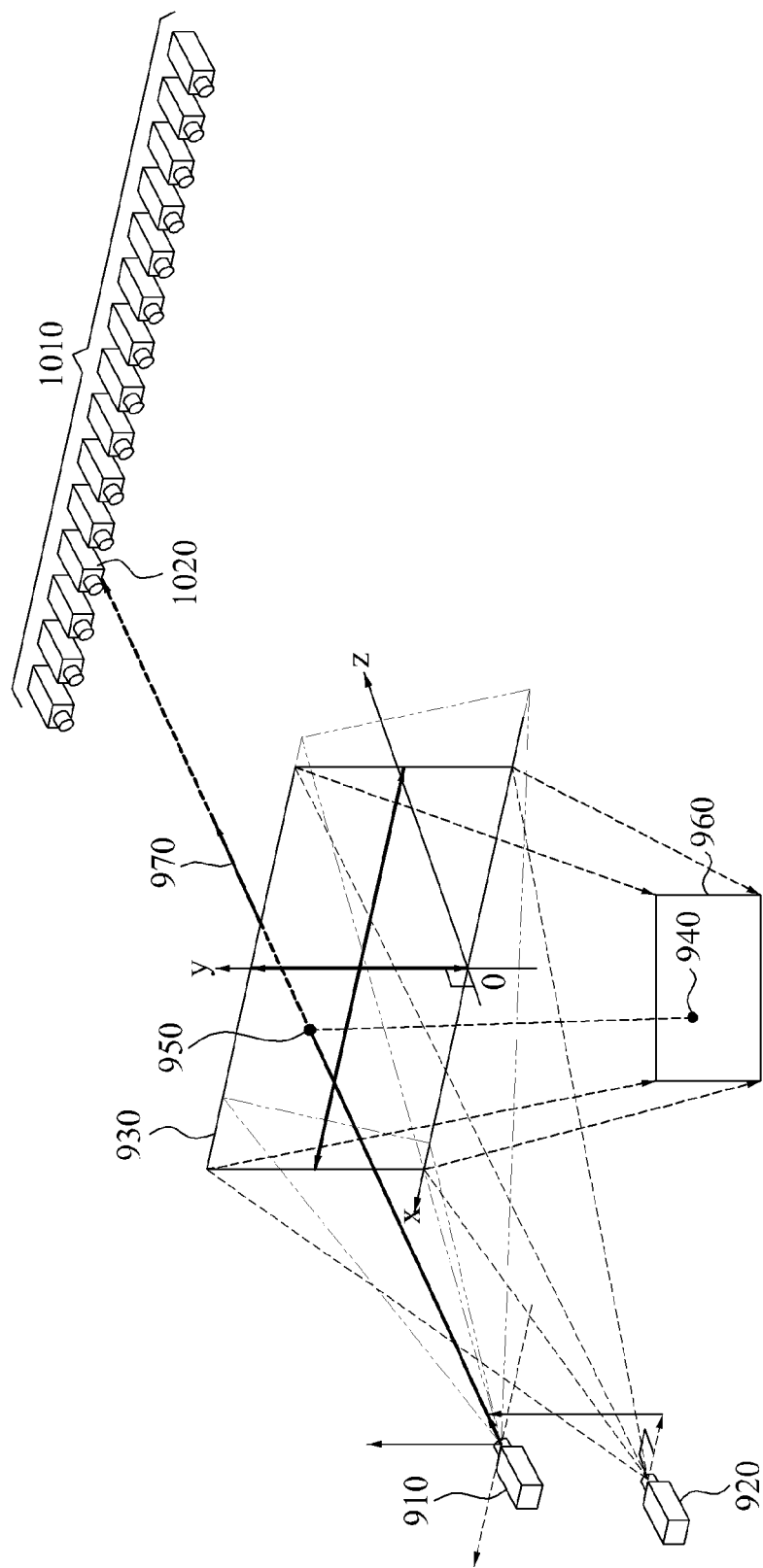
FIG. 10 illustrates an image processing operation using a multi-view image having a horizontal parallax and a plurality of projectors, according to one or more embodiments.

FIG. 10 illustrates image processing operation using a multi-view image having a horizontal parallax and a plurality of projectors, according to one or more embodiments.

Different from FIG. 9, FIG. 10 illustrates a case in which view images 1010 having only a horizontal parallax are used or input, as only an example. In this case, an image processing apparatus may use only horizontal components of the rays emanating from the projectors 910 and 920. A structure for determining pixel values of display pixels of the projectors 910 and 920 may be the same as described with reference to FIG. 9. The image processing apparatus may determine a view image 1020 corresponding to the display pixel or the ray 970 emanating from the display pixel. Next, the image processing apparatus may recognize the coordinate 940 corresponding to the position 950 on the screen 930 that the ray 970 emanating from the display pixel reaches. The image processing apparatus may determine the pixel value of the display pixel related to the ray 970 based on the coordinate 940. The image processing apparatus may perform the foregoing process with respect to all display pixels of the first projector 910 and the second projector 920.

Figure 11:
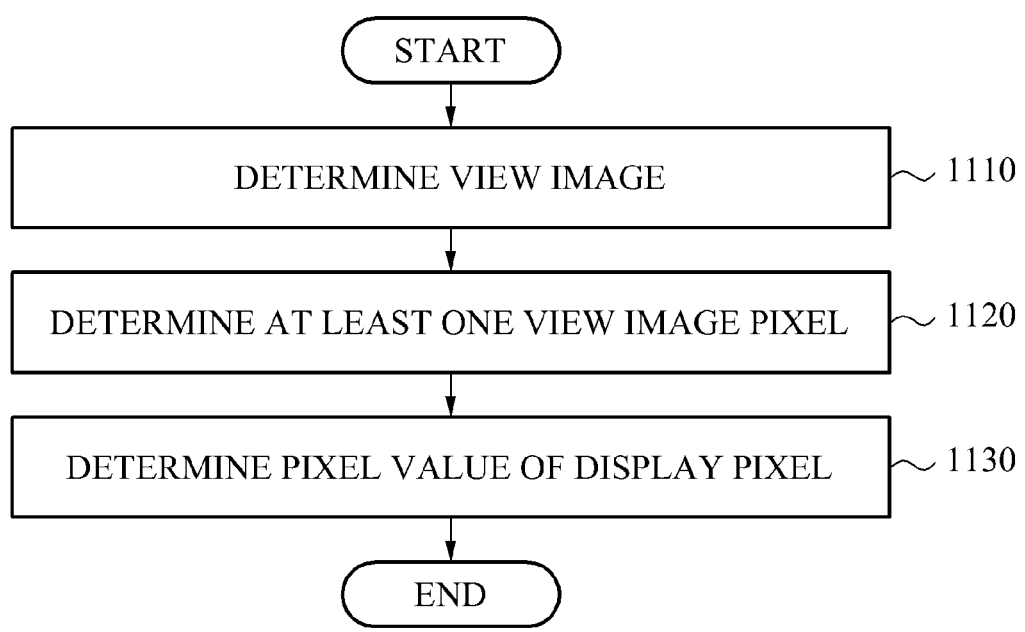
FIG. 11 illustrates an image processing method, according to one or more embodiments.

FIG. 11 illustrates an image processing method, according to one or more embodiments.

In operation 1110, an image processing apparatus, such as any of the image processing apparatuses of FIGS. 1-2 and 4-5, may determine view images corresponding to rays respectively emanating from display pixels, using the emanating rays and views of view images constituting a multi-view image. In detail, the image processing apparatus may determine a view image having a closest view to the emanating rays among a plurality of the view images, as the view image corresponding to the emanating rays.

Alternatively, the image processing apparatus may generate a view image having a new view by interpolating a plurality of view images having views close to the emanating rays among the plurality of view images. When distances between the rays emanating from the display pixels and the views of the view images are included in a predetermined threshold range, the image processing apparatus may perform interpolation based on the view images. The image processing apparatus may determine the view image newly generated through interpolation as the view image corresponding to the display pixels or the emanating rays.

In operation 1120, the image processing apparatus may determine at least one view image pixel corresponding to the display pixels in the view images using positions of the display pixels.

The image processing apparatus may recognize a coordinate corresponding to the positions of the display pixels in a display region. Next, the image processing apparatus may determine the view image pixel using the coordinate corresponding to the positions of the display pixels in the display region of the view images.

In detail, the image processing apparatus may recognize pixels corresponding to the coordinate among the view image pixels. According to one or more embodiments, the image processing apparatus may determine a view image pixel closest to a position of the view image corresponding to the coordinate, as the view image pixel corresponding to the display pixels.

Alternatively, the image processing apparatus may determine view image pixels close to the position of the view image corresponding to the coordinate, as the view image pixel corresponding to the display pixels. In this case, the image processing apparatus may determine view image pixels included in the predetermined threshold range, based on the position of the view image corresponding to the coordinate and the distances between the view image pixels.

In operation 1130, the image processing apparatus may determine pixel values of the display pixels based on pixel values of the view image pixels determined by the image processing apparatus. The image processing apparatus may determine the pixel values of the view image pixels as the pixel values of the corresponding display pixels.

When the image processing apparatus determines a plurality of view image pixels close to the coordinate, the image processing apparatus may interpolate the pixel values of the view image pixels. Here, the image processing apparatus may perform interpolation by averaging the pixel values of the view images or applying a predetermined interpolation formula. The image processing apparatus may determine the interpolated pixel values as the pixel values of the display pixels.

Through the foregoing process, the view images may be determined with respect to the display pixels of the light field display, and most proper pixel values may be applied to the display pixels based on the pixel values of the corresponding view images.

Figure 12:
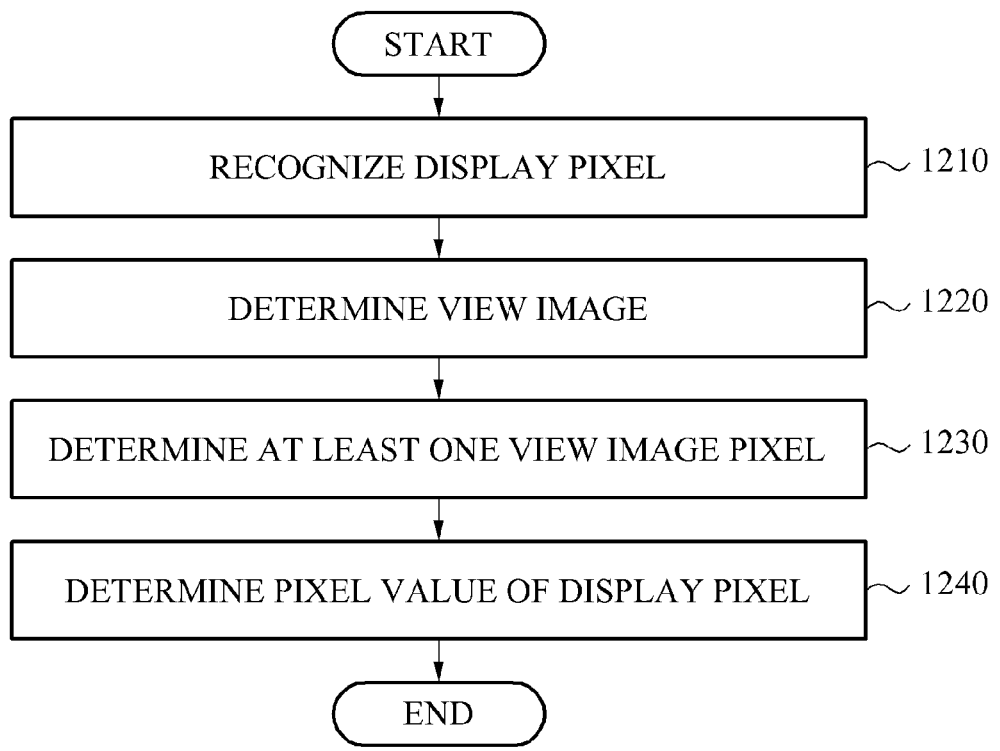
FIG. 12 illustrates an image processing method, according to one or more embodiments.

FIG. 12 illustrates an image processing method, according to one or more embodiments.

In operation 1210, an image processing apparatus may recognize display pixels to which pixel values are to be applied, based on determined positions of one or more users' eyes. The positions of the user eyes may be obtained using a sensor. In one or more embodiments, the sensor may be a camera that photographs the user eyes and thereby generates a 3D spatial coordinate, for example. The image processing apparatus may obtain the positions of the user eyes using a 2D image of the user eyes or a depth image of the user eyes, for example.

In detail, the image processing apparatus may recognize at least one display pixel satisfying that a distance between rays emanating from the display pixels and the user eyes is not more than a predetermined threshold. Here, the predetermined threshold may be set depending on whether the rays emanating from the display pixels are included in a region that will be visible to the user eyes. The image processing apparatus may recognize the display pixels for image processing, through the foregoing process, and thus recognize display pixels for which further image processing may not be implemented, or for which further image processing based on plural view images may not be implemented.

In operation 1220, the image processing apparatus may determine view images corresponding to the rays respectively emanating from the display pixels, using the rays and views of the view images making up a multi-view image. In detail, the view image processing apparatus may determine a view image having a closest view to the rays, among the plurality of view images, as the view image corresponding to the rays.

Alternatively, the image processing apparatus may generate a view image having a new view by interpolating a plurality of view images having views close to the rays among the plurality of view images. When distances between a projection of the rays emanating from the display pixels and the views of the view images are included in a predetermined threshold range, the image processing apparatus may perform interpolation based on the view images. The image processing apparatus may determine the view image newly generated through interpolation as the view image corresponding to the display pixels or the rays.

In operation 1230, the image processing apparatus may determine at least one view image pixel corresponding to the display pixels in the view images using positions of the display pixels.

The image processing apparatus may recognize a coordinate corresponding to the position of the display pixel in the display region. Next, the image processing apparatus may determine the view image pixel using the coordinate corresponding to the positions of the display pixels in the display region of the view images.

In detail, the image processing apparatus may recognize pixels corresponding to the coordinate among the view image pixels. According to one or more embodiments, the image processing apparatus may determine a view image pixel closest to a position of the view image corresponding to the coordinate, as the view image pixel corresponding to the display pixels.

Alternatively, the image processing apparatus may determine view image pixels close to the position of the view image corresponding to the coordinate, as the view image pixel corresponding to the display pixels. In this case, the image processing apparatus may determine view image pixels included in the predetermined threshold range, based on the position of the view image corresponding to the coordinate and the distances between the view image pixels.

In operation 1240, the image processing apparatus may determine pixel values of the display pixels based on pixel values of the view image pixels determined by the image processing apparatus. The image processing apparatus may determine the pixel values of the view image pixels as the pixel values of the corresponding display pixels.

When the image processing apparatus determines a plurality of view image pixels close to the coordinate, the image processing apparatus may interpolate the pixel values of the view image pixels. Here, the image processing apparatus may perform interpolation by averaging the pixel values of the view images or applying a predetermined interpolation formula. The image processing apparatus may determine the interpolated pixel values as the pixel values of the display pixels.

Through the foregoing process, the image processing apparatus may selectively perform image processing with respect to display pixels of the light field display. By performing image processing with respect to only part of the display pixels, the image processing apparatus may reduce an amount of calculation and accordingly increase image processing speed.

According to one or more embodiments, when the display directions defined by the underlying light field display differs from the photographing condition of the provided multi-view image, the position of the corresponding pixel in the different view images may be different according to the photographed position of the view images. In consideration of the preceding, an occurrence of distortion may be prevented or minimized in a displaying of the multi-view image according to one or more embodiments herein.

Here, in a conventional multi-view display, a number of sweet spots of the display correspond to the number of the views, and the multi-view display is specialized in expressing the images photographed in the sweet spot. However, distortion occurs in the conventional multi-view display during the process of outputting 3D images, especially when the photographing condition differs from the condition required in the display.

Rather, one or more embodiments minimize such an occurrence of distortion using information regarding the photographing condition of the image, such as the aforementioned photographing information of the multi-view image.

Further, in a general light field display (or a display using the multi projectors) in which a sweet spot may not be defined, a particular portion of the display may not be completely in accord with a particular view image, and a multi-view image may not be naturally expressed. One or more embodiments process an image such that a multi-view image can be naturally expressed in such a general light field display. Here, in one or more embodiments, the multi-view image may be displayed with a minimum occurrence of distortion, when displaying the multi-view image photographed with a photographing condition different from the condition required in the underlying light field display, as such photographing information is taken into consideration.

Depending on embodiment, apparatuses, systems, and units descriptions herein may respectively include one or more hardware devices or hardware processing elements. For example, in one or more embodiments, any described apparatus, system, and unit may further include one or more desirable memories, display elements, and any desired hardware input/output transmission devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented by at least one processing device, such as a processor or computer, but not limited to the same. Further to the above described embodiments, embodiments can also be implemented through computer readable code/instructions in/on a non-transitory medium, e.g., a computer readable medium, to control at least one processing device to implement any or all above described embodiments. Depending on embodiment, the computer readable code or instructions may be specially designed and constructed for the purposes of one or more embodiments. Depending on embodiment, the medium can be a non-transitory medium and correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device. The processing element may be a specially designed computing device to implement one or more of the embodiments described herein.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image processing method comprising:
   determining, from among plural different-view images, a view image having a closest view to a display direction of a display pixel of a display;
   determining a view image pixel corresponding to the display pixel in the determined view image based on a position of the display pixel in the display; and
   determining a pixel value of the display pixel based on a pixel value of the determined view image pixel.

2. The image processing method of claim 1, wherein the determining of the view image includes determining the view image based on different display directions of select display pixels not identically respectively matching view directions of different-view images of the object.

3. The image processing method of claim 1, wherein the determining of the view image includes determining the view image when photographing information of different-view images of the object indicates that a number of different-view images of the object is different from a number of display directions of select display pixels of the display.

4. An image processing method comprising:
   interpolating at least two of plural different-view images having viewing directions close to a predetermined display direction of a display pixel of a display;
   determining at least one view image pixel corresponding to the display pixel in an interpolated view image generated by the interpolation based on a position of the display pixel in the display; and determining a pixel value of the display pixel based on a pixel value of the determined at least one view image pixel.

5. The image processing method of claim 1, wherein the determining of the view image pixel comprises:
determining the view image pixel using a coordinate corresponding to a position of the display pixel in a display region of the determined view image.

6. The image processing method of claim 5, wherein the determining of the view image pixel comprises:
determining a view image pixel closest to a position corresponding to the coordinate in the determined view image to be the determined view image pixel.

7. The image processing method of claim 5, wherein the determining of the view image pixel comprises determining view image pixels close to the position corresponding to the coordinate in the determined view image to be the determined view image pixel,
wherein the determining of the pixel value of the display pixel comprises interpolating pixel values of the determined view image pixels close to the position of the coordinate and determining a result of the interpolation to be the determined pixel value of the display pixel.

8. The image processing method of claim 1, further comprising recognizing which display pixels of the display are display pixels that a pixel value is to be determined, based on determined positions of user eyes indicating which of the display pixels the user would observe.

9. An image processing method comprising:
recognizing a display pixel, of plural display pixels of a display, to which a pixel value is to be applied, based on positions of user eyes; and
performing a pixel value determination if the display pixel is recognized, including:
determining, from among a plurality of different-view images, a view image having a closest view to a display direction of the recognized display pixel;
determining a view image pixel corresponding to the recognized display pixel in the determined view image based on a position of the recognized display pixel in the display; and
determining a pixel value of the recognized display pixel based on a pixel value of the view image pixel.

10. The image processing method of claim 9, wherein the determining of the view image includes determining the view image based on different display directions of select display pixels not identically respectively matching view directions of different-view images of the object.

11. The image processing method of claim 9, wherein the determining of the view image includes determining the view image when photographing information of different-view images of the object indicates that a number of different-view images of the object is different from a number of display directions of select display pixels of the display.

12. The image processing method of claim 9, wherein the recognizing of the display pixel comprises:
recognizing a display pixel satisfying a condition that a distance between a ray emanating from the recognized display pixel and the positions of the user eyes is less than or equal to a threshold.

13. An image processing method comprising:
recognizing a display pixel, of plural display pixels of a display, to which a pixel value is to be applied, based on positions of user eyes; and
performing a pixel value determination upon the display pixel being recognized, the performing of the pixel value determination including:
interpolating at least two of a plurality of different-view images having viewing directions close to a predetermined display direction of the recognized display pixel;
determining at least one view image pixel corresponding to the recognized display pixel in an interpolated view image generated by the interpolation based on a position of the recognized display pixel in the display; and
determining a pixel value of the recognized display pixel based on a pixel value of the at least one image pixel.

14. The image processing method of claim 9, wherein the determining of the view image pixel comprises:
determining the view image pixel using a coordinate corresponding to a position of the recognized display pixel in a display region of the determined view image.

15. The image processing method of claim 14, wherein the determining of the view image pixel comprises:
determining a view image pixel closest to a position corresponding to the coordinate in the determined view image to be the determined view image pixel.

16. The image processing method of claim 14, wherein the determining of the view image pixel comprises determining view image pixels close to the position corresponding to the coordinate in the determined view image to be the determined view image pixel,
wherein the determining of the pixel value of the display pixel comprises interpolating pixel values of the determined view image pixels close to the position of the coordinate and determining a result of the interpolation to be the determined pixel value.

17. An image processing apparatus comprising:
at least one processor configured to:
determine, from among a plurality of different-view images, a view image having a closest view to a display direction of a display pixel of a display;
determine a view image pixel corresponding to the display pixel in the determined view image based on a position of the display pixel in the display; and
determine a pixel value of the display pixel based on a pixel value of the determined view image pixel.

18. The image processing apparatus of claim 17,
wherein the at least one processor is further configured to determine the pixel value of the display pixel by interpolating pixel values of close view image pixels.

19. An image processing apparatus comprising:
at least one processor configured to:
interpolate at least two of plural different-view images having viewing directions close to a predetermined display direction of a display pixel of a display;
determine at least one view image pixel corresponding to the display pixel in an interpolated view image generated by the interpolation based on a position of the display pixel in the display; and
determine a pixel value of the display pixel based on a pixel value of the determined at least one view image pixel.

* * * * *